(12) United States Patent
Han et al.

(10) Patent No.: US 9,848,353 B2
(45) Date of Patent: *Dec. 19, 2017

(54) PERIODIC CHANNEL STATE INFORMATION REPORTING FOR TIME DIVISION DUPLEX (TDD) CARRIER AGGREGATION SYSTEMS

(71) Applicant: INTEL CORPORATION, Santa Clara, CA (US)

(72) Inventors: Seunghee Han, San Jose, CA (US); Hong He, Beijing (CN); Jong-Kae Fwu, Sunnyvale, CA (US); Alexei Davydov, Nizhny Novgorod (RU); Ilya Bolotin, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,576

(22) Filed: Nov. 19, 2015

(65) Prior Publication Data
US 2016/0080134 A1    Mar. 17, 2016

Related U.S. Application Data

(63) Continuation of application No. 14/473,292, filed on Aug. 29, 2014, which is a continuation of application
(Continued)

(51) Int. Cl.
*H04W 28/02* (2009.01)
*H04W 48/14* (2009.01)
(Continued)

(52) U.S. Cl.
CPC .......... *H04W 28/0221* (2013.01); *H04B 5/00* (2013.01); *H04L 65/4084* (2013.01);
(Continued)

(58) Field of Classification Search
None
See application file for complete search history.

(56) References Cited

U.S. PATENT DOCUMENTS 9,504,067 B2 * 11/2016 Sohn ............... H04L 1/0026
2011/0242982 A1   10/2011 Lunttila et al.
(Continued)

FOREIGN PATENT DOCUMENTS

CN          101908951 A     12/2010
KR     WO 2012008815 A2 *   1/2012 ........... H04W 24/10
(Continued)

OTHER PUBLICATIONS

Huawei, "CSI feedback modes for CoMP", 3GPP TSG RAN WG1 meeting #68bis.*
(Continued)

*Primary Examiner* — Peter Chau
(74) *Attorney, Agent, or Firm* — Thorpe North & Western

(57) ABSTRACT

Technology for a user equipment (UE) operable to report periodic channel state information (CSI) is disclosed. The UE can determine a reporting period ($N_{pd}$) of the UE for a serving cell. The UE can identify a Time-Division Duplex (TDD) uplink-downlink (UL-DL) configuration of a primary cell of the UE. The UE can transmit a periodic CSI report for the serving cell to an evolved node B (eNB) using a physical uplink control channel (PUCCH) on the primary cell according to the reporting period. The UE can use the reporting period of $N_{pd}=1$ for the serving cell if the TDD UL-DL configuration of the primary cell is one of 0, 1, 3, 4, or 6 and all UL subframes of the primary cell in a radio frame are used for periodic CSI reporting.

17 Claims, 12 Drawing Sheets

Related U.S. Application Data

No. 13/886,795, filed on May 3, 2013, now Pat. No. 9,161,254.

(60) Provisional application No. 61/707,784, filed on Sep. 28, 2012.

(51) Int. Cl.

| | | |
|---|---|---|
| *H04W 72/04* | (2009.01) | |
| *H04W 76/04* | (2009.01) | |
| *H04L 29/06* | (2006.01) | |
| *H04W 52/02* | (2009.01) | |
| *H04W 40/00* | (2009.01) | |
| *H04W 76/06* | (2009.01) | |
| *H04B 5/00* | (2006.01) | |
| *H04W 4/00* | (2009.01) | |
| *H04W 40/24* | (2009.01) | |
| *H04W 52/04* | (2009.01) | |
| *H04W 36/08* | (2009.01) | |
| *H04W 48/18* | (2009.01) | |

(52) U.S. Cl.
CPC ........... *H04L 65/608* (2013.01); *H04W 4/005* (2013.01); *H04W 40/005* (2013.01); *H04W 40/246* (2013.01); *H04W 48/14* (2013.01); *H04W 52/0209* (2013.01); *H04W 52/0212* (2013.01); *H04W 52/0225* (2013.01); *H04W 52/0235* (2013.01); *H04W 52/0258* (2013.01); *H04W 52/04* (2013.01); *H04W 72/0406* (2013.01); *H04W 76/048* (2013.01); *H04W 76/06* (2013.01); *H04W 36/08* (2013.01); *H04W 48/18* (2013.01); *H04W 52/0261* (2013.01); *Y02B 60/50* (2013.01)

(56) References Cited

U.S. PATENT DOCUMENTS

| | | |
|---|---|---|
| 2011/0244847 A1 | 10/2011 | Mallik et al. |
| 2011/0268045 A1 | 11/2011 | Heo et al. |
| 2011/0274099 A1 | 11/2011 | Kwon et al. |
| 2012/0002568 A1 | 1/2012 | Tiirola et al. |
| 2012/0076028 A1 | 3/2012 | Ko et al. |
| 2012/0106511 A1 | 5/2012 | Wu |
| 2012/0127869 A1 | 5/2012 | Yin et al. |
| 2012/0134275 A1 | 5/2012 | Choi et al. |
| 2012/0140649 A1 | 6/2012 | Choudhury et al. |
| 2012/0140708 A1 | 6/2012 | Choudhury et al. |
| 2012/0182910 A1 | 7/2012 | Nakashima et al. |
| 2012/0201154 A1 | 8/2012 | Chandrasekhar et al. |
| 2012/0257524 A1 | 10/2012 | Chen et al. |
| 2012/0281601 A1 | 11/2012 | Kuo et al. |
| 2013/0021980 A1 | 1/2013 | Yang et al. |
| 2013/0028205 A1* | 1/2013 | Damnjanovic ......... H04L 5/001 370/329 |
| 2013/0039231 A1* | 2/2013 | Wang .................... H04W 72/10 370/280 |
| 2013/0064211 A1 | 3/2013 | Tanaka |
| 2013/0114455 A1 | 5/2013 | Yoo et al. |
| 2013/0114554 A1* | 5/2013 | Yang .................... H04W 24/10 370/329 |
| 2013/0148613 A1 | 6/2013 | Han et al. |
| 2013/0188591 A1 | 7/2013 | Ko et al. |
| 2013/0242902 A1* | 9/2013 | Liu ........................ H04W 24/10 370/329 |
| 2013/0286904 A1* | 10/2013 | Xu ......................... H04L 1/0026 370/280 |
| 2013/0322376 A1* | 12/2013 | Marinier ................ H04W 72/06 370/329 |
| 2014/0016714 A1 | 1/2014 | Chen et al. |
| 2014/0086084 A1* | 3/2014 | Bi .......................... H04L 1/0026 370/252 |
| 2014/0086155 A1* | 3/2014 | Chen .................... H04B 7/0626 370/329 |
| 2014/0086174 A1* | 3/2014 | Nam ..................... H04L 1/0003 370/329 |
| 2014/0169300 A1* | 6/2014 | Kim ...................... H04L 5/0057 370/329 |
| 2014/0247798 A1 | 9/2014 | Lunttila et al. |
| 2014/0286296 A1 | 9/2014 | Tiirola et al. |

FOREIGN PATENT DOCUMENTS

| | | |
|---|---|---|
| WO | WO 2012/008815 A2 | 1/2012 |
| WO | WO 2012/011718 A2 | 1/2012 |
| WO | WO 2012/088152 A2 | 1/2012 |
| WO | WO 2012057571 A2 | 5/2012 |
| WO | WO 2012/091342 A2 | 7/2012 |
| WO | WO 2012/099369 A2 | 7/2012 |
| WO | WO 2014/052084 A1 | 4/2014 |

OTHER PUBLICATIONS

LG Electronics; "TDD DL-UL Reconfiguration Methods for eIMTA"; 3GPP TSG R1-122318; (May 21-25, 2012); 5 pages; RAN WG1 Meeting #69, Prague, Czech Republic; Agenda: 7.10.3.

Samsung; "Discussion on PUCCH HARQ-ACK transmission"; 3GPP TSG R1-122220; (May 21-25, 2012); 5 pages; RAN WG1 #69, Prague, Czech Republic; Agenda 7.2.1.5.

Office Action issued Sep. 26, 2017, in Chinese Patent Application 201380045272.7, filed Sep. 17, 2013.

\* cited by examiner

| PUCCH Reporting Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4+L | NA | 4+L |
| | | RI > 1 | NA | 7+L | NA | 4+L |
| 1a | Sub-band CQI / second PMI | 8 antenna ports RI = 1 | NA | 8+L | NA | NA |
| | | 8 antenna ports 1 < RI < 5 | NA | 9+L | NA | NA |
| | | 8 antenna ports RI > 4 | NA | 7+L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI / second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| 2c | Wideband CQI / first PMI / second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA | NA |
| | | 4 antenna ports, 4-layer spatial multiplexing | 2 | 2 | 2 | 2 |
| | | 8 antenna ports, 4-layer spatial multiplexing | 2 | NA | NA | NA |
| | | 8-layer spatial multiplexing | 3 | NA | NA | NA |

FIG. 6

| $I_{CQI/PMI}$ | Value of $N_{pd}$ | Value of $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | Reserved ||

FIG. 7

PERIODIC CHANNEL STATE INFORMATION REPORTING FOR TIME DIVISION DUPLEX (TDD) CARRIER AGGREGATION SYSTEMS

RELATED APPLICATIONS

The present application is a continuation of U.S. patent application Ser. No. 14/473,292 filed Aug. 29, 2014 which is a continuation of U.S. patent application Ser. No. 13/886,795 filed May 3, 2013 which claims the benefit of U.S. Provisional Patent Application No. 61/707,784, filed Sep. 28, 2012, each of which are incorporated by reference herein.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 illustrates a table of physical uplink control channel (PUCCH) reporting types per PUCCH reporting mode and mode state in accordance with an example;

FIG. 7 is a table for determining a periodicity value ($N_{pd}$) and an offset value ($N_{OFFSET,CQI}$) according to a CQI-PMI configuration index parameter ($I_{CQI/PMI}$) in accordance with an example;

Figure 1:
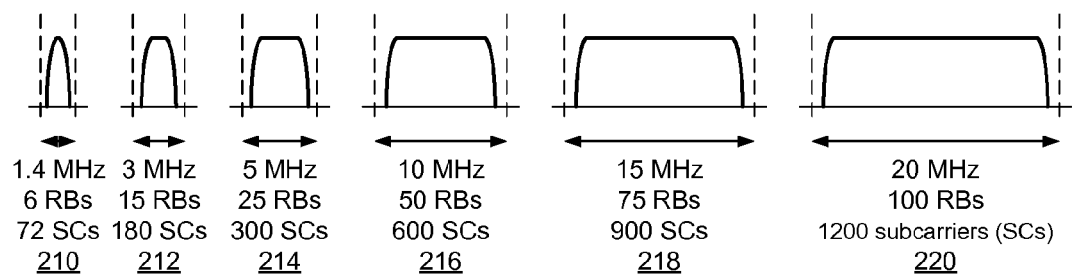
FIG. 1 illustrates a block diagram of various component carrier (CC) bandwidths in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An increase in the amount of wireless data transmission has created congestion in wireless networks using licensed spectrum to provide wireless communication services for wireless devices, such as smart phones and tablet devices. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device (e.g., UE). In carrier aggregation (CA) multiple component carriers (CC) can be aggregated and jointly used for transmission to/from a single terminal. Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains.

FIG. 1 illustrates a carrier bandwidth, signal bandwidth, or a component carrier (CC) that can be used by the wireless device. For example, the LTE CC bandwidths can include: 1.4 MHz 210, 3 MHz 212, 5 MHz 214, 10 MHz 216, 15 MHz 218, and 20 MHz 220. The 1.4 MHz CC can include 6 resource blocks (RBs) comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Carrier aggregation (CA) enables multiple carrier signals to be simultaneously communicated between a user's wireless device and a node. Multiple different carriers can be used. In some instances, the carriers may be from different permitted frequency domains. Carrier aggregation provides a broader choice to the wireless devices, enabling more bandwidth to be obtained. The greater bandwidth can be used to communicate bandwidth intensive operations, such as streaming video or communicating large data files.

Figure 2A:
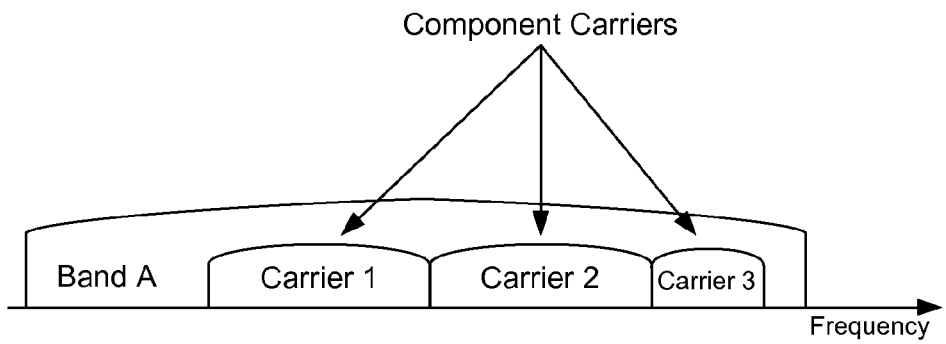
FIG. 2A illustrates a block diagram of multiple contiguous component carriers in accordance with an example.

FIG. 2A illustrates an example of carrier aggregation of continuous carriers. In the example, three carriers are contiguously located along a frequency band. Each carrier can be referred to as a component carrier. In a continuous type of system, the component carriers are located adjacent one another and can be typically located within a single frequency band (e.g., band A). A frequency band can be a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band. In contiguous carrier aggregation, only one fast Fourier transform (FFT) module and/or one radio frontend may be used. The contiguous component carriers can have similar propagation characteristics which can utilize similar reports and/or processing modules.

Figure 2B:
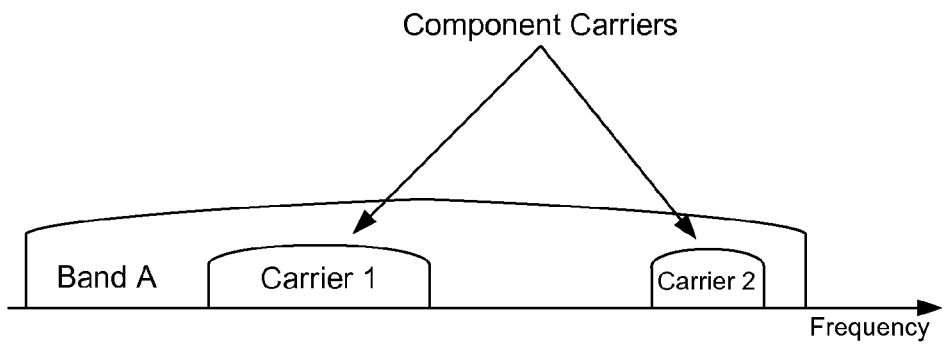
FIG. 2B illustrates a block diagram of intra-band non-contiguous component carriers in accordance with an example.
Figure 2C:
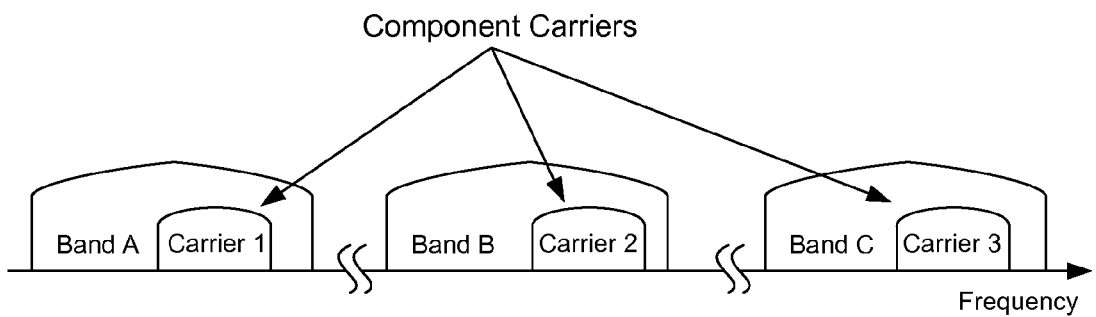
FIG. 2C illustrates a block diagram of inter-band non-contiguous component carriers in accordance with an example.

FIGS. 2B-2C illustrates an example of carrier aggregation of non-continuous component carriers. The non-continuous component carriers may be separated along the frequency range. Each component carrier may even be located in different frequency bands. Non-contiguous carrier aggregation can provide aggregation of a fragmented spectrum. Intra-band (or single-band) non-contiguous carrier aggregation provides non-contiguous carrier aggregation within a same frequency band (e.g., band A), as illustrated in FIG. 2B. Inter-band (or multi-band) non-contiguous carrier aggregation provides non-contiguous carrier aggregation within different frequency bands (e.g., bands A, B, or C), as illustrated in FIG. 2C. The ability to use component carriers in different frequency bands can enable more efficient use of available bandwidth and increases the aggregated data throughput.

Figure 3A:
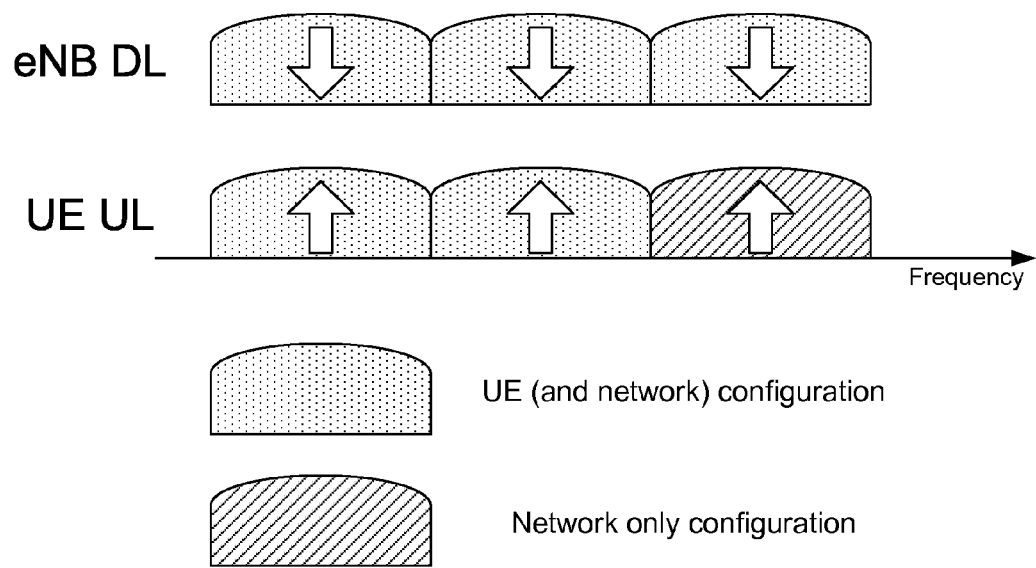
FIG. 3A illustrates a block diagram of a symmetric-asymmetric carrier aggregation configuration in accordance with an example.
Figure 3B:
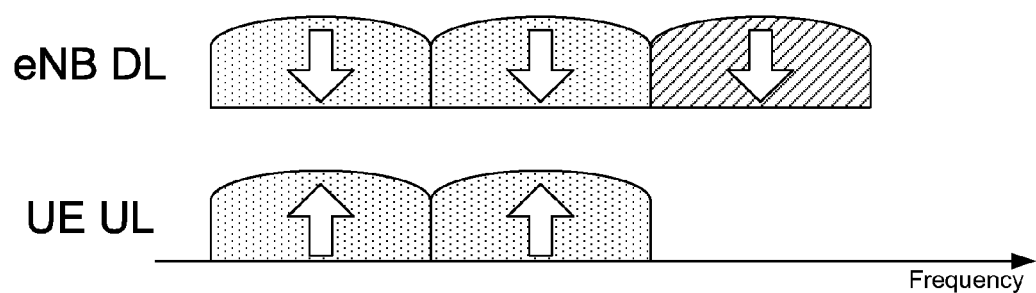
FIG. 3B illustrates a block diagram of an asymmetric-symmetric carrier aggregation configuration in accordance with an example.

Network symmetric (or asymmetric) carrier aggregation can be defined by a number of downlink (DL) and uplink (UL) component carriers offered by a network in a sector. UE symmetric (or asymmetric) carrier aggregation can be defined by a number of downlink (DL) and uplink (UL) component carriers configured for a UE. The number of DL CCs may be at least the number of UL CCs. A system information block type 2 (SIB2) can provide specific linking between the DL and the UL by means of signaling EUTRA Absolute Radio Frequency Channel Number (EARFCN) for the UL which is associated with a corresponding DL. FIG. 3A illustrates a block diagram of a symmetric-asymmetric carrier aggregation configuration, where the carrier aggregation is symmetric between the DL and UL for the network and asymmetric between the DL and UL for the UE. FIG. 3B illustrates a block diagram of an asymmetric-symmetric carrier aggregation configuration, where the carrier aggregation is asymmetric between the DL and UL for the network and symmetric between the DL and UL for the UE.

Figure 4:
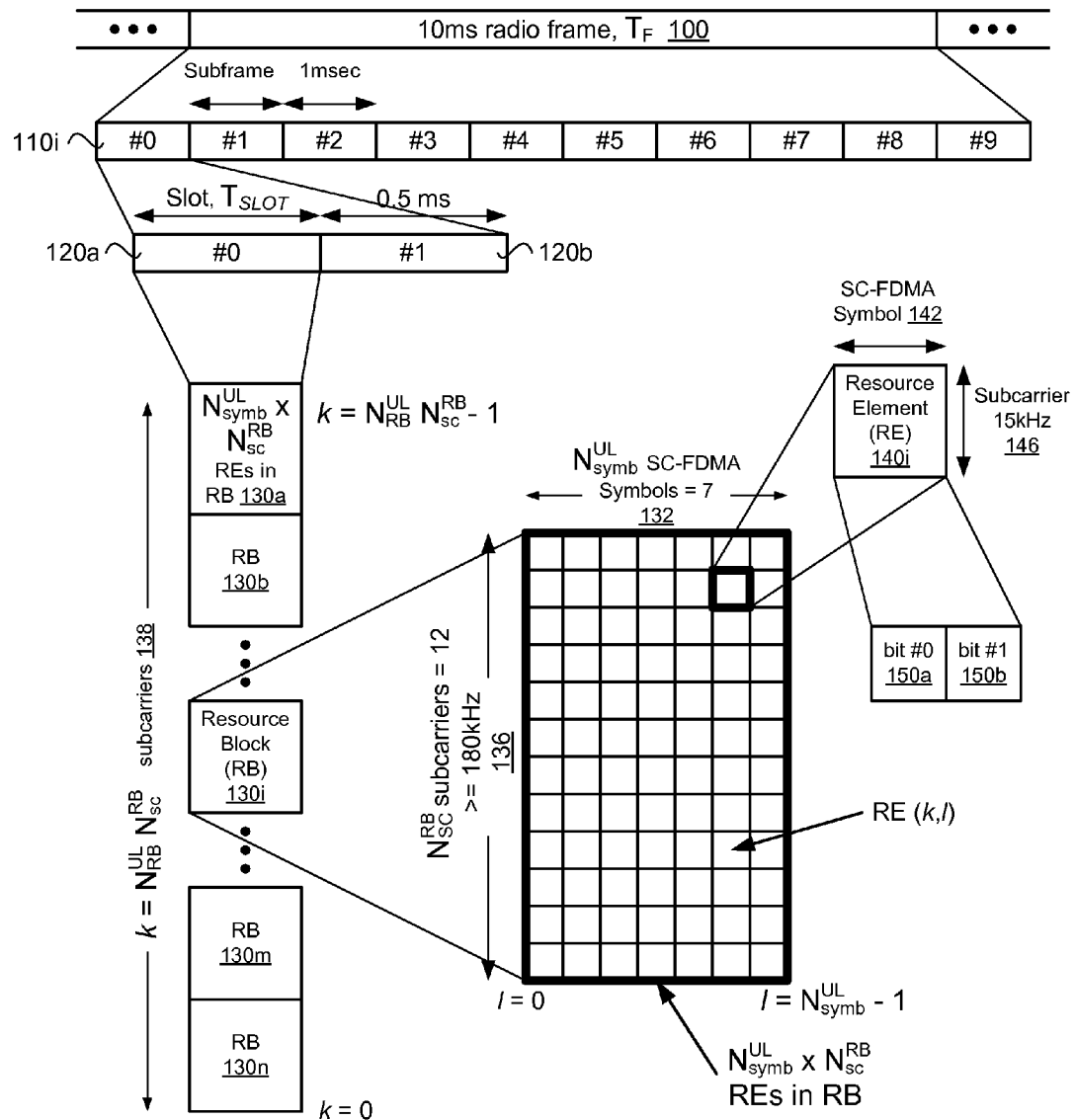
FIG. 4 illustrates a block diagram of uplink radio frame resources (e.g., a resource grid) in accordance with an example.

A component carrier can be used to carry channel information via a radio frame structure transmitted on the physical (PHY) layer in a uplink transmission between a node (e.g., eNodeB) and the wireless device (e.g., UE) using a generic long term evolution (LTE) frame structure, as illustrated in FIG. 4. While an LTE frame structure is illustrated, a frame structure for an IEEE 802.16 standard (WiMax), an IEEE 802.11 standard (WiFi), or another type of communication standard using SC-FDMA or OFDMA may also be used.

FIG. 4 illustrates an uplink radio frame structure. In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130a, 130b, 130i, 130m, and 130n based on the CC frequency bandwidth. Each RB (physical RB or PRB) 130i can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one SC-FDMA symbol 142 by one subcarrier (i.e., 15 kHz) 146. Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

Reference signals (RS) can be transmitted by SC-FDMA symbols via resource elements in the resource blocks. Reference signals (or pilot signals or tones) can be a known signal used for various reasons, such as to synchronize timing, estimate a channel, and/or noise in the channel. Reference signals can be received and transmitted by wireless devices and nodes. Different types of reference signals (RS) can be used in a RB. For example, in LTE systems, uplink reference signal types can include a sounding reference signal (SRS) and a UE-specific reference signal (UE-specific RS or UE-RS) or a demodulation reference signal (DM-RS). In LTE systems, downlink reference signal types can include channel state information reference signals (CSI-RS) which can be measured by a wireless device to provide CSI reports on a channel.

An uplink signal or channel can include data on a Physical Uplink Shared CHannel (PUSCH) or control information on a Physical Uplink Control CHannel (PUCCH). In LTE, the uplink physical channel (PUCCH) carrying uplink control information (UCI) can include channel state information (CSI) reports, Hybrid Automatic Retransmission reQuest (HARQ) ACKnowledgment/Negative ACKnowledgment (ACK/NACK) and uplink scheduling requests (SR).

The wireless device can provide aperiodic CSI reporting using the PUSCH or periodic CSI reporting using PUCCH. The PUCCH can support multiple formats (i.e., PUCCH format) with various modulation and coding schemes (MCS), as shown for LTE in Table 1. For example, PUCCH format 3 can be used to convey multi-bit HARQ-ACK, which can be used for a UE supporting carrier aggregation in Time Division Duplex (TDD).

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Figure 5:
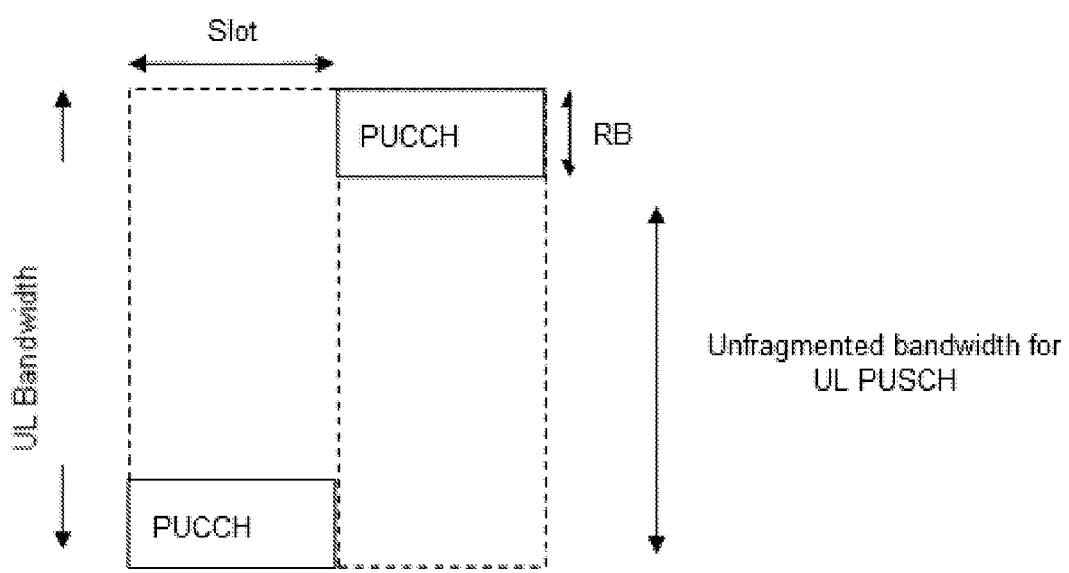
FIG. 5 illustrates a block diagram of frequency hopping for a physical uplink control channel (PUCCH) in accordance with an example.

In another example, PUCCH format 2 can use frequency hopping, as illustrated in FIG. 5. Frequency hopping can be a method of transmitting radio signals by rapidly switching a carrier among many frequency channels using a pseudo-random sequence or specified sequence known to both a transmitter (e.g., UE in an uplink) and a receiver (e.g., eNB in the uplink). Frequency hopping can enable the UE to exploit the frequency diversity of a wideband channel used in LTE in an uplink while keeping a contiguous allocation (in the time domain).

The PUCCH can include various channel state information (CSI) reports. The CSI components in the CSI reports can include a channel quality indicator (CQI), a precoding matrix indicator (PMI), a precoding type indicator (PTI), and/or rank indication (RI) reporting type. The CQI can be signaled by a UE to the eNodeB to indicate a suitable data rate, such as a modulation and coding scheme (MCS) value, for downlink transmissions, which can be based on a measurement of the received downlink signal to interference plus noise ratio (SINR) and knowledge of the UE's receiver characteristics. The PMI can be a signal fed back by the UE to support multiple-input multiple-output (MIMO) operation. The PMI can correspond to an index of the precoder (within a codebook shared by the UE and eNodeB), which can maximize an aggregate number of data bits which can be received across all downlink spatial transmission layers. PTI can be used to distinguish slow from fast fading environments. The RI can be signaled to the eNodeB by UEs configured for PDSCH transmission modes 3 (e.g., open-loop spatial multiplexing) and 4 (e.g., closed-loop spatial multiplexing). RI can correspond to a number of useful transmission layers for spatial multiplexing (based on the UE's estimate of the downlink channel), enabling the eNodeB to adapt the PDSCH transmissions accordingly.

The granularity of a CQI report can be divided into three levels: wideband, UE selected subband, and higher layer configured subband. The wideband CQI report can provide one CQI value for an entire downlink system bandwidth. The UE selected subband CQI report can divide the system bandwidth into multiple subbands, where the UE can select a set of preferred subbands (the best M subbands), then report one CQI value for the wideband and one differential CQI value for the set (assuming transmission only over the selected M subbands). The higher layer configured subband CQI report can provide a highest granularity. In the higher layer configured subband CQI report, the wireless device can divide the entire system bandwidth into multiple subbands, then reports one wideband CQI value and multiple differential CQI values, such as one for each subband.

The UCI carried by the PUCCH can use different PUCCH reporting types (or CQI/PMI and RI reporting types) to specify which CSI reports are being transmitted. For example, PUCCH reporting Type 1 can support CQI feedback for UE selected sub-bands; Type 1a can support subband CQI and second PMI feedback; Type 2, Type 2b, and Type 2c can support wideband CQI and PMI feedback; Type 2a can support wideband PMI feedback; Type 3 can supports RI feedback; Type 4 can supports wideband CQI; Type 5 can support RI and wideband PMI feedback; and Type 6 can support RI and PTI feedback.

Different CSI components can be included based on the PUCCH reporting type. For example, RI can be included in PUCCH reporting types 3, 5, or 6. Wideband PTI can be included in PUCCH reporting type 6. Wideband PMI can be included in PUCCH reporting types 2a or 5. Wideband CQI can be included in PUCCH reporting types 2, 2b, 2c, or 4.

Subband CQI can be included in PUCCH reporting types 1 or 1a.

The CQI/PMI and RI (PUCCH) reporting types with distinct periods and offsets can be supported for the PUCCH CSI reporting modes illustrated by the table in FIG. 5. FIG. 5 illustrates an example for LTE of the PUCCH reporting type and payload size per PUCCH reporting mode and mode state.

The CSI information reported can vary based on the downlink transmission scenarios used. The various scenarios for the downlink can be reflected in different transmission modes (TMs). For example, in LTE, TM 1 can use a single transmit antenna; TM 2 can use transmit diversity; TM 3 can use open loop spatial multiplexing with cyclic delay diversity (CDD); TM 4 can use closed loop spatial multiplexing; TM 5 can use multi-user MIMO (MU-MIMO); TM 6 can use closed loop spatial multiplexing using a single transmission layer; TM 7 can use beamforming with UE-specific RS; TM 8 can use single or dual-layer beamforming with UE-specific RS; and TM 9 can use a multilayer transmission to support closed-loop single user MIMO (SU-MIMO) or carrier aggregation. In an example, TM 10 can be used for coordinated multipoint (CoMP) signaling, such as joint processing (JP), dynamic point selection (DPS), and/or coordinated scheduling/coordinated beamforming (CS/CB).

Each transmission mode can use different PUCCH CSI reporting modes, where each PUCCH CSI reporting mode can represent different CQI and PMI feedback types, as shown for LTE in Table 2.

TABLE 2

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

For example, in LTE, TMs 1, 2, 3, and 7 can use PUCCH CSI reporting modes 1-0 or 2-0; TMs 4, 5, and 6 can use PUCCH CSI reporting modes 1-1 or 2-1; TM 8 can use PUCCH CSI reporting modes 1-1 or 2-1 if the UE is configured with PMI/RI reporting, or PUCCH CSI reporting modes 1-0 or 2-0 if the UE is configured without PMI/RI reporting; and TMs 9 and 10 can use PUCCH CSI reporting modes 1-1 or 2-1 if the UE is configured with PMI/RI reporting and number of CSI-RS ports is greater than one, or PUCCH CSI reporting modes 1-0 or 2-0 if the UE is configured without PMI/RI reporting or number of CSI-RS ports is equal to one. Based on the downlink transmission scheme (e.g., transmission mode), a UE can generate more CSI reports than may be permitted to be transmitted to nodes (e.g., eNBs) without generating a signal collision or interference. The wireless device (e.g. UE) may make a determination on the CSI reports to keep and transmit and which CSI reports to drop or discard (and not transmit) to avoid a collision on a subframe.

In CSI reporting, the PUCCH format 2 can convey 4 to 11 CSI (CQI/PMI/PTI/RI) bits from the UE to the eNB. In carrier aggregation, each serving cell can be independently configured by radio resource control (RRC) signaling regarding a CSI configuration, such as a periodicity, a starting offset, or a PUCCH mode. However, the transmission of CSI using PUCCH format 2 may only be performed in primary cell. In an example using PUCCH format 2, one CSI report for a specified serving cell may be transmitted while the remaining CSI reports for other serving cells may be dropped when more than one CSI report for multiple serving cells has a potential to collide with each other in a same subframe. Dropping the CSI reports for other serving cells may prevent the collision of the CSI reports in the same subframe. In an example, the criteria used to determine the priority of a periodic CSI reports transmitted and the periodic CSI reports that are dropped can be based on a PUCCH reporting type with a lower CSI reporting type priority being dropped. PUCCH reporting types 3, 5, 6, and 2a can have a highest or top priority, and PUCCH reporting types 2, 2b, 2c, and 4 can have a next priority or a second priority, and PUCCH reporting types 1 and 1a can have a third or lowest priority. So, the UE can drop the CSI reports with PUCCH reporting types 1, 1a, first, then drop the CSI reports with PUCCH reporting types 2, 2b, 2c, and 4, second, then drop any CSI reports with PUCCH reporting types 3, 5, 6, and 2a above the number of CSI report(s) to be transmitted. In an example, a CSI report can be generated for each component carrier (CC). Each CC can be represented by a serving cell index (i.e., ServCellIndex). Among CSI reports having reporting types with a same priority (e.g., PUCCH reporting types 3, 5, 6, and 2a), a priority of a cell can decrease as the corresponding serving cell index (i.e., ServCellIndex) increases (i.e., the lower cell index has higher priority).

In another example, the CSI report priority can be based on the CSI component, where RI and wideband PMI reporting have a higher priority than CQI reporting, and wideband CQI reporting has a higher priority than subband CQI reporting. RI can have a higher priority because RI can provide general information about a network channel condition. In an example, PMI and CQI can be dependent on RI. Wideband CQI can have higher priority than subband CQI, because wideband CQI can provide general quality information about a channel or to a worst case scenario of the channel, whereas the subband CQI provides narrower subband channel quality information.

FIG. 7 is a table for determining a reporting periodicity value ($N_{pd}$) and a subframe offset value ($N_{OFFSET,CQI}$) according to a CQI-PMI configuration index parameter ($I_{CQI/PMI}$) in Frequency Division Duplex (FDD), half-duplex FDD, and Time Division Duplex (TDD). For each serving cell, the $N_{pd}$ (in subframes) and the $N_{OFFSET,CQI}$ (in subframes) for periodic CQI/PMI reporting may be determined based on the $I_{CQI/PMI}$ configuration index parameter. The UE may receive the $I_{CQI/PMI}$ configuration index parameter from an evolved node B (eNB) and calculate the corresponding reporting periodicity $N_{pd}$ and the subframe offset value $N_{OFFSET,CQI}$. In one example, the $I_{CQI/PMI}$ configuration index parameter may be configured by Radio Resource Control (RRC) signaling.

In periodic CQI/PMI reporting for TDD, the periodicity values (e.g., 1, 5, 10, etc.) may depend on the TDD UL/DL configuration for a serving cell. For example, the reporting period of $N_{pd}=1$ for a serving cell may be applicable to TDD UL/DL configurations 0, 1, 3, 4, and 6 for the serving cell, where all UL subframes in a radio frame are used for CQI/PMI reporting. The reporting period of $N_{pd}=5$ for a serving cell may be applicable to TDD UL/DL configurations 0, 1, 2, and 6 for the serving cell. In addition, the reporting periods of $N_{pd}=\{10, 20, 40, 80, 160\}$ may be applicable to all TDD UL/DL configurations (i.e., TDD UL/DL configurations 0, 1, 2, 3, 4, 5, and 6).

Figure 8:
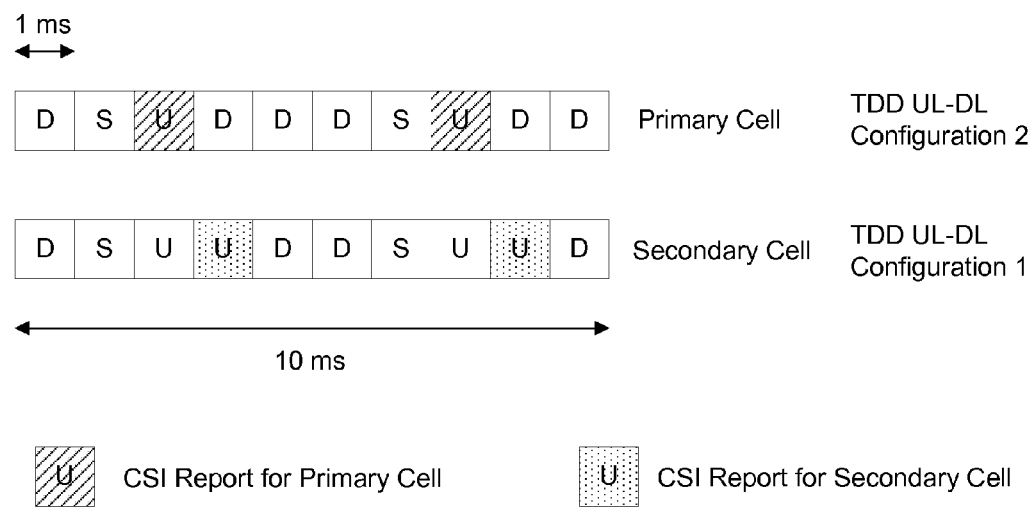
FIG. 8 illustrates periodic channel state information (CSI) reporting subframes for a primary cell and a secondary cell with different Time Division Duplex (TDD) uplink-downlink (UL-DL) configurations in accordance with an example.

FIG. 8 illustrates periodic channel state information (CSI) reporting subframes for a primary cell and a secondary cell with different Time Division Duplex (TDD) uplink-downlink (UL-DL) configurations. The UE may periodically measure the CSI of each of the radio channels used for transmitting data to the UE and report the CSI to the eNB via an uplink feedback channel. The uplink feedback channel may be included in a Physical Uplink Control Channel (PUCCH) or a Physical Uplink Shared Channel (PUSCH). The content of the CSI may include a rank indicator (RI), a channel quality indicator (CQI), a precoding type indicator (PTI), and/or a precoding matrix indicator (PMI) for each downlink component carrier (CC). In carrier aggregation, the downlink CC may include a primary cell and/or up to four secondary cells. For each of the downlink CCs that are being used to transmit data to the UE, the UE may periodically report the CSI to the eNB via the uplink feedback channel.

The periodic CSI report for each serving cell (i.e., the primary cell and up to four secondary cells) may be independently configured for carrier aggregation. Thus, each serving cell may be configured to report CSI to the eNB based on a periodicity value or a reporting period (i.e., $N_{pd}$) and an offset value (i.e., $N_{OFFSET,CQI}$). The periodicity value and the offset value may be used to determine one or more periodic CSI reporting instances for the serving cell. In other words, the periodic CSI reporting instances for the serving cell may correspond with uplink (UL) subframes of the serving cell. Thus, the UL subframes of the serving cell may be used to periodically report the CSI to the eNB based on the periodicity and offset of the serving cell.

In carrier aggregation, the periodic CSI report for the secondary cell may be transmitted to the eNB by a Physical Uplink Control Channel (PUCCH) on the primary cell. In particular, the periodic CSI report of the secondary cell may be transmitted via the PUCCH on the primary cell when the periodic CSI reporting instance of the secondary cell corresponds with an UL subframe of the primary cell. In other words, the secondary cell may be scheduled to report the periodic CSI at an UL subframe that corresponds with the UL subframe in the primary cell. In particular, the periodic CSI report of the secondary cell may be transmitted via PUCCH format 2, 2a, 2b, or 3 on the primary cell.

In one configuration, the primary cell may have a Time Division Duplex (TDD) Uplink-Downlink (UL-DL) configuration different than the TDD UL-DL configuration of the secondary cell. For example, the primary cell may have a TDD UL-DL configuration of 2 and the secondary cell may have a TDD UL-DL configuration of 1. Since the periodic CSI report of the primary cell may be transmitted to the eNB on the PUCCH on the primary cell, the different TDD UL-DL configurations of the primary cell and the secondary cell may not affect the periodic CSI report of the primary cell. However, due to the different TDD UL-DL configurations, the periodic CSI report for the secondary cell may be scheduled during a periodic CSI reporting instance that does not correspond with the UL subframe in the primary cell. As a result, the UE may be unable to report the periodic CSI for the secondary cell to the eNB. In other words, if the primary cell and the secondary cell have different TDD UL-DL configurations, then the UL-DL patterns between the primary cell and the secondary cell may not match and periodic CSI reports for the secondary cell may not be transmitted via the primary cell.

As shown in FIG. 8, the primary cell may have TDD UL-DL configuration 2 and the secondary cell may have TDD UL-DL configuration 1. The $I_{CQI/PMI}$ value of the primary cell may be 3 (i.e., the $N_{pd}$=5 and the $N_{OFFSET,CQI}$=2) and the $I_{CQI/PMI}$ value of the secondary cell may be 4 (i.e., the $N_{pd}$=5 and the $N_{OFFSET,CQI}$=3). Therefore, the UE does not have an UL subframe in the primary cell to transmit the periodic CSI report for the secondary cell. In contrast, if the primary cell and the secondary cell have the same TDD UL-DL configuration, the primary cell may have an UL subframe to send the periodic CSI report for the secondary cell to the eNB when the secondary cell has an UL subframe.

In order to report the CSI of the secondary cell based on a periodic CSI reporting instance when the primary cell does not have a corresponding UL subframe, the UE may perform one or more actions. For example, the UE may determine that the secondary cell has a Physical Uplink Shared Channel (PUSCH) on the periodic CSI reporting instance (i.e., the UL subframe) of the secondary cell. In other words, the UE may determine that, on the UL subframe of the secondary cell that is scheduled to report the CSI, the secondary cell has a PUSCH. Thus, the UE may multiplex the periodic CSI report for the secondary cell on the PUSCH when the UL subframe is unavailable on the primary cell and an UL-SCH (Uplink Shared Channel) on the secondary cell is available in the UL subframe of the secondary cell. Therefore, the UE may transmit uplink control information (UCI), such as the periodic CSI report for the secondary cell, and the UL-SCH using the PUSCH of the secondary cell.

In one configuration, the UE may drop the periodic CSI report for the secondary cell in response to determining that the periodic CSI reporting instance for the secondary cell does not correspond with the UL subframe of the primary cell. In addition, the UE may drop the periodic CSI report when the secondary cell does not include the PUSCH with the UL-SCH. In other words, the UE may drop the periodic CSI report for the secondary cell that was scheduled to be transmitted to the eNB by PUCCH format 2 or 2a or 2b or 3 on the primary cell.

Since the UE may transmit the periodic CSI report for the secondary cell in the PUCCH of the primary cell, the following periodicity values may apply depending on the TDD UL/DL configuration: the reporting period of Npd=1 for a serving cell may apply to TDD UL-DL configurations 0, 1, 3, 4, or 6 for the primary cell and all UL subframes of the primary cell are used for periodic CSI reporting, the Npd value of 5 for a serving cell may apply to TDD UL-DL configurations 0, 1, 2, or 6 for the primary cell, and the Npd value of 10, 20, 40, 80, or 160 for a serving cell may apply to TDD UL-DL configurations 0, 1, 2, 3, 4, 5, or 6 for the primary cell. In other words, the above periodicity values may identify which UL subframes are available for the primary cell based on the $N_{pd}$ value for a serving cell, as PUCCH is transmitted on the primary cell and not the secondary cell.

In addition, the periodic reporting time definitions may be modified in reference to the primary cell which transmits the periodic CSI of the secondary cell, to the eNB, on the PUCCH on the primary cell. The periodic reporting time may be given below. In the case where wideband CQI/PMI reporting is configured, the reporting instances for wideband CQI/PMI are subframes satisfying $(10 \times n_f + \lfloor n_s/2 \rfloor - N_{OFFSET,CQI}) \bmod(N_{pd})=0$, where $n_f$ is the number and $n_s$ is the slot index within a subframe (0 to 1) for the primary cell. In addition, $N_{OFFSET,CQI}$ is the corresponding wideband CQI/PMI reporting offset in subframes, and $N_{pd}$ is the wideband CQI/PMI period in subframes. The parameters $N_{OFFSET,CQI}$ and $N_{pd}$ are for the primary cell or the secondary cell configured by RRC signaling.

In case RI reporting is configured, the reporting interval of the RI reporting is an integer multiple $M_{RI}$ of period Npd (in subframes). The parameter $M_{RI}$ is selected from the set {1, 2, 4, 8, 16, 32, OFF}. The reporting instances for RI are subframes satisfying $(10 \times n_f + \lfloor n_s/2 \rfloor - N_{OFFSET,CQI} - N_{OFFSET,RI}) \bmod (N_{pd} \cdot M_{RI}) = 0$, where $N_{OFFSET,RI}$ is the corresponding relative RI offset to the wideband CQI/PMI reporting offset in subframes. In addition, $N_{OFFSET,RI}$ may be a parameter for the primary cell or the secondary cell configured by RRC signaling.

The periodicity $N_{pd}$ and the offset $N_{OFFSET,CQI}$ for wideband CQI/PMI reporting are determined based on the parameter cqi-pmi-ConfigurationIndex. The periodicity $M_{RI}$ and offset $N_{OFFSET,RI}$ for RI reporting are determined based on the parameter ri-ConfigurationIndex. Both cqi-pmi-ConfigurationIndex and ri-ConfigurationIndex are configured by higher-layer signaling from the eNB to the UE.

In the case where both wideband CQI/PMI and subband CQI reporting are configured, the reporting instances for wideband CQI are subframes satisfying $(10 \times n_f + \lfloor n_s/2 \rfloor - N_{OFFSET,CQI}) \bmod N_{pd} = 0$.

The PTI may not be transmitted (e.g., the PTI may not be configured) or the most recently transmitted PTI may be equal to 1. As a result, the wideband CQI/wideband PMI (or wideband CQI/wideband second PMI for transmission mode 9) report has period $N \cdot N_{pd}$, and is reported on the subframes satisfying $(10 \times n_f + \lfloor n_s/2 \rfloor - N_{OFFSET,CQI}) \bmod (H \cdot N_{pd}) = 0$. The integer H is defined as $H = J \cdot K + 1$, where J is the number of bandwidth parts. As previously stated, $n_f$ is the system frame number and $n_s$ is the slot index within a subframe (0 to 1) for the primary cell. In addition, the parameters $N_{OFFSET,CQI}$, H, J, K and $N_{pd}$ are for the primary cell and the secondary cell configured by RRC signaling.

Between every two consecutive wideband CQI/wideband PMI (or wideband CQI/wideband second PMI for transmission mode 9) reports, the remaining J·K reporting instances are used in sequence for subband CQI reports on K full cycles of bandwidth parts except when the gap between two consecutive wideband CQI/PMI reports contains less than J·K reporting instances due to a system frame number transition to 0, in which case the UE shall not transmit the remainder of the subband CQI reports which have not been transmitted before the second of the two wideband CQI/wideband PMI (or wideband CQI/wideband second PMI for transmission mode 9) reports. Each full cycle of bandwidth parts shall be in increasing order starting from bandwidth part 0 to bandwidth part J–1. The parameter K is configured by higher-layer signaling.

When the most recently transmitted PTI is 0, the wideband first precoding matrix indicator report has period $H \cdot N_{pd}$, and is reported on the subframes satisfying $(10 \times n_f + \lfloor n_s/2 \rfloor - N_{OFFSET,CQI}) \bmod (H' \cdot N_{pd}) = 0$, where H' is signaled by higher layers. In addition, H' may be for the primary cell or the secondary cell configured by RRC signaling. Between every two consecutive wideband first precoding matrix indicator reports, the remaining reporting instances are used for a wideband second precoding matrix indicator with wideband CQI as described below.

In case RI reporting is configured, the reporting interval of RI is $M_{RI}$ times the wideband CQI/PMI period $H \cdot N_{pd}$, and RI is reported on the same PUCCH cyclic shift resource as both the wideband CQI/PMI and subband CQI reports. The reporting instances for RI are subframes satisfying $(10 \times n_f + \lfloor n_s/2 \rfloor - N_{OFFSET,CQI} - N_{OFFSET,RI}) \bmod (H \cdot N_{pd} \cdot M_{RI}) = 0$. As previously discussed, $n_f$ and $n_s$ are, respectively, the system frame number and slot index within a subframe (0 to 1) for the primary cell. In addition, the parameters $N_{OFFSET,CQI}$, $N_{OFFSET,RI}$, H, $N_{pd}$, $M_{RI}$, H', J, K, etc. may be for the primary cell or the secondary cell configured by RRC signaling. As a result, the periodic reporting times include that the primary cell may transmit the periodic CSI report for the secondary cell via the PUCCH on the primary cell.

In one configuration, the network (e.g., the eNB) may verify that the periodic CSI reporting configuration (e.g., periodicity, offset) for the CQI/PMI/RI/PTI reporting for the secondary cell is the same as the periodic CSI reporting configuration of the primary cell. For example, the UE may receive, from the eNB, a CSI reporting configuration of the secondary cell, based on a Channel Quality Index-Precoding Matrix Indicator (CQI-PMI) configuration index that determines both a periodicity ($N_{pd}$) and an offset for the periodic CSI reporting instance in the UL subframes. In addition, the UE may receive the CSI reporting configuration of the secondary cell that corresponds with a CSI reporting configuration of the primary cell. The network may verify that the CSI reporting configuration of the secondary cell is the same as the CSI reporting configuration of the primary cell, which may minimize the likelihood of the periodic CSI report of the secondary cell being dropped because there is no corresponding UL subframe in the primary cell.

In addition, the UE may override the CSI reporting configuration (e.g., the periodicity and offset) of the secondary cell with the CSI reporting configuration of the primary cell when the UL subframe on the secondary cell does not correspond with the UL subframe on the primary cell. In other words, the CSI reporting configuration of the primary cell may be applied to the secondary cell. As a result, the DL/UL subframes between the primary cell and the secondary cell may match, thereby providing an UL subframe on the primary cell during the periodic CSI reporting instance of the secondary cell.

In one configuration, the network (e.g., the eNB) may verify that the periodic CSI report for the secondary cell is not scheduled to occur during an UL subframe of the secondary cell when the primary cell does not have an UL subframe. In addition, the UE may receive a Channel Quality Index-Precoding Matrix Indicator (CQI-PMI) configuration index for the primary cell to enable the periodic CSI reporting instance for the secondary cell to correspond with the UL subframe of the primary cell. As a result, the UE may transmit the periodic CSI report for the secondary cell on the PUCCH on the primary cell without dropping the periodic CSI report of the secondary cell.

In order to perform the PUCCH transmission on the primary cell for the periodic CSI report of the secondary cell, the network (e.g., the eNB) may configure the periodicity of the periodic CSI reports to at least 10 ms. For example the periodicity of the periodic CSI reports may be every 10, 20, 40, 80, or 160 milliseconds (ms).

In one configuration, the UE may delay the periodic CSI report for the secondary cell to a succeeding UL subframe of the primary cell when the UL subframe on the primary cell does not correspond to the periodic CSI reporting instance on the secondary cell. For example, the UE may delay the periodic CSI report to the next available UL subframe in the primary cell. The UE may determine that the periodic CSI report delayed to the succeeding UL subframe in the primary cell collides with a previously scheduled periodic CSI report to occur during the succeeding UL subframe (i.e., two CSI reports are attempting to be transmitted in the same subframe). Thus, the UE may drop the periodic CSI report with a lower CSI reporting type priority between the colliding CSI reports. For example, the PUCCH reporting types 3, 5, 6, and 2a may have a priority higher than PUCCH reporting types 1, 1a, 2, 2b, 2c, and 4, and PUCCH reporting types 2, 2b, 2c, and 4 may have a priority higher than PUCCH reporting types 1 and 1a. In one example, a priority of a cell decreases as the corresponding serving cell index (i.e., ServCellIndex) increases when the CSI reporting types are the same priority level. In other words, the lower cell index has a lower priority level.

In a scenario when carrier aggregation and coordinated multipoint (CoMP) transmission mode 10 are applied together, a report type has a priority higher than the CSI process index and the serving cell index, and the CSI process index has a priority higher than the serving cell index. For a UE in transmission mode 10, a collision between the periodic CSI reports of the same serving cell with the PUCCH reporting type of the same priority, and the CSI reports correspond to different CSI processes, the periodic CSI reports corresponding to all CSI processes except the CSI process with the lowest CSIProcessIndex may be dropped. For a given subframe and UE in transmission mode 10, the periodic CSI reports of all serving cells except the serving cell with a lowest serving cell index (i.e., ServCellIndex) may be dropped when the periodic CSI reports of different serving cells with PUCCH reporting types of the same priority levels with the periodic CSI reports corresponding to CSI processes with a same CSIProcessIndex. For a given subframe and UE in transmission mode 10, the periodic CSI reports of all serving cells except the serving cell with periodic CSI reports corresponding to a CSI process with the lowest CSIProcessIndex may be dropped when the periodic CSI reports of different serving cells with a PUCCH reporting type of the same priority level collides with the periodic CSI reports corresponding to CSI processes with a different CSIProcessIndex. Therefore, periodic CSI reports that collide with other CSI reports (i.e., in the same UL subframe of the primary cell) may be dropped according to the above dropping principles.

In one configuration, the network (e.g., the eNB) may verify that the p-CSI configuration for the secondary cell is a subset of the p-CSI configuration of the primary cell. However, the offset value may or may not be the same. For example, the p-CSI configuration $I_{CQI/PMI}$ for the primary cell may be 1 (i.e., $N_{pd}$=5 and $N_{OFFSET,CQI}$=0). Therefore, the eNB may ensure that the p-CSI configuration $I_{CQI/PMI}$ for the secondary cell is 7 (i.e., $N_{pd}$=10 and $N_{OFFSET,CQI}$=1). As a result, the PUCCH transmission may occur on the primary cell for the periodic CSI report of the secondary cell.

Figure 9:
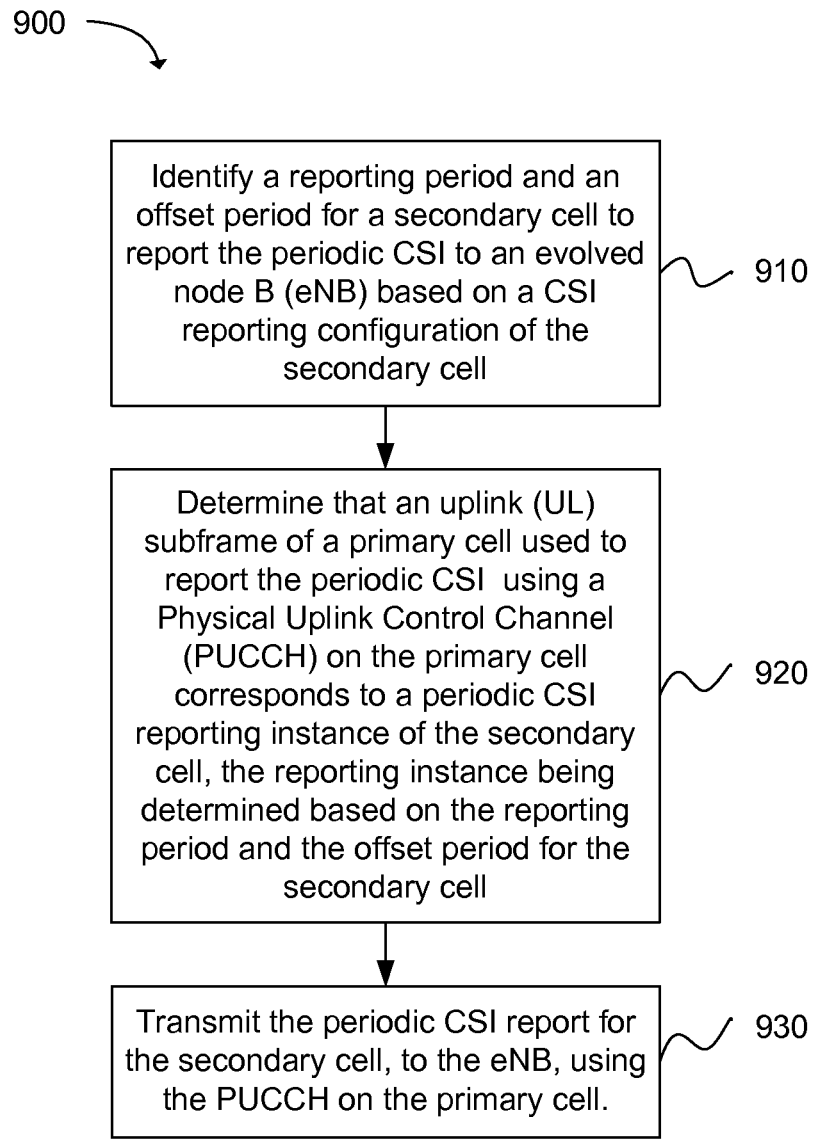
FIG. 9 depicts functionality of computer circuitry of a user equipment (UE) operable to report periodic channel state information (CSI) in accordance with an example.

Another example provides functionality 900 of computer circuitry of a user equipment (UE) operable to report periodic channel state information (CSI), as shown in the flow chart in FIG. 9. The functionality may be implemented as a method or the functionality may be executed as instructions on a machine, where the instructions are included on at least one computer readable medium or one non-transitory machine readable storage medium. The computer circuitry can be configured to identify a reporting period and an offset period for a secondary cell to report the periodic CSI to an evolved node B (eNB) based on a CSI reporting configuration of the secondary cell, as in block 910. The computer circuitry can be further configured to determine that an uplink (UL) subframe of a primary cell used to report the periodic CSI using a Physical Uplink Control Channel (PUCCH) on the primary cell corresponds to a periodic CSI reporting instance of the secondary cell, the reporting instance being determined based on the reporting period and the offset period for the secondary cell, as in block 920. The computer circuitry can also be configured to transmit the periodic CSI report for the secondary cell, to the eNB, using the PUCCH on the primary cell, as in block 930.

In one configuration, the computer circuitry can be configured to determine that the subframe corresponding to the to a periodic CSI reporting instance of the secondary cell does not correspond with the UL subframe of the primary cell; and transmit the periodic CSI report for the secondary cell, to the eNB, using a Physical Uplink Shared Channel (PUSCH) on the secondary cell. In addition, the computer circuitry may be configured to transmit the periodic CSI report for the secondary cell using the PUCCH on the primary cell, wherein a reporting period of $N_{pd}$=1 for a serving cell applies to Time-Division Duplex (TDD) uplink-downlink (UL-DL) configurations 0, 1, 3, 4, or 6 for the primary cell and all UL subframes of the primary cell are used for periodic CSI reporting, the $N_{pd}$ value of 5 applies to TDD UL-DL configurations 0, 1, 2, or 6 for the primary cell, and the $N_{pd}$ value of 10, 20, 40, 80, or 160 applies to TDD UL-DL configurations 0, 1, 2, 3, 4, 5, or 6 for the primary cell.

In an example, the UL subframe of the primary cell can be used to transmit the periodic CSI of the secondary cell to the eNB when the periodic CSI reporting instance for the secondary cell corresponds with the UL subframe of the primary cell. In addition, the primary cell can have a Time-Division Duplex (TDD) uplink-downlink (UL-DL) configuration different than the TDD UL-DL configuration of the secondary cell.

In another example, the computer circuitry can be configured to drop the periodic CSI report for the secondary cell in response to determining that the periodic CSI reporting instance for the secondary cell does not correspond with the UL subframe of the primary cell. Furthermore, the periodic CSI report for the secondary cell can be transmitted on one of a Physical Uplink Control Channel (PUCCH) format 2 or 2a or 2b or 3 of the primary cell when the UL subframe of the primary cell corresponds with the periodic CSI reporting instance for the secondary cell.

In one configuration, the computer circuitry can be configured to multiplex the periodic CSI report for the secondary cell on a Physical Uplink Shared Channel (PUSCH) of the secondary cell when the UL subframe is unavailable on the primary cell and an UL-SCH (Uplink Shared Channel) on the secondary cell is available in the UL subframe of the secondary cell. In addition, the computer circuitry can be configured to receive the CSI reporting configuration of the secondary cell, based on a Channel Quality Index-Precoding Matrix Indicator (CQI-PMI) configuration index that determines both the reporting period (Npd) and the offset period for the periodic CSI reporting instance in the UL subframes of the secondary cell.

In addition, the computer circuitry may be configured to override the CSI reporting configuration of the secondary cell with a CSI reporting configuration of the primary cell when the periodic CSI reporting instance for the secondary cell does not correspond with the UL subframe on the primary cell.

Figure 10:
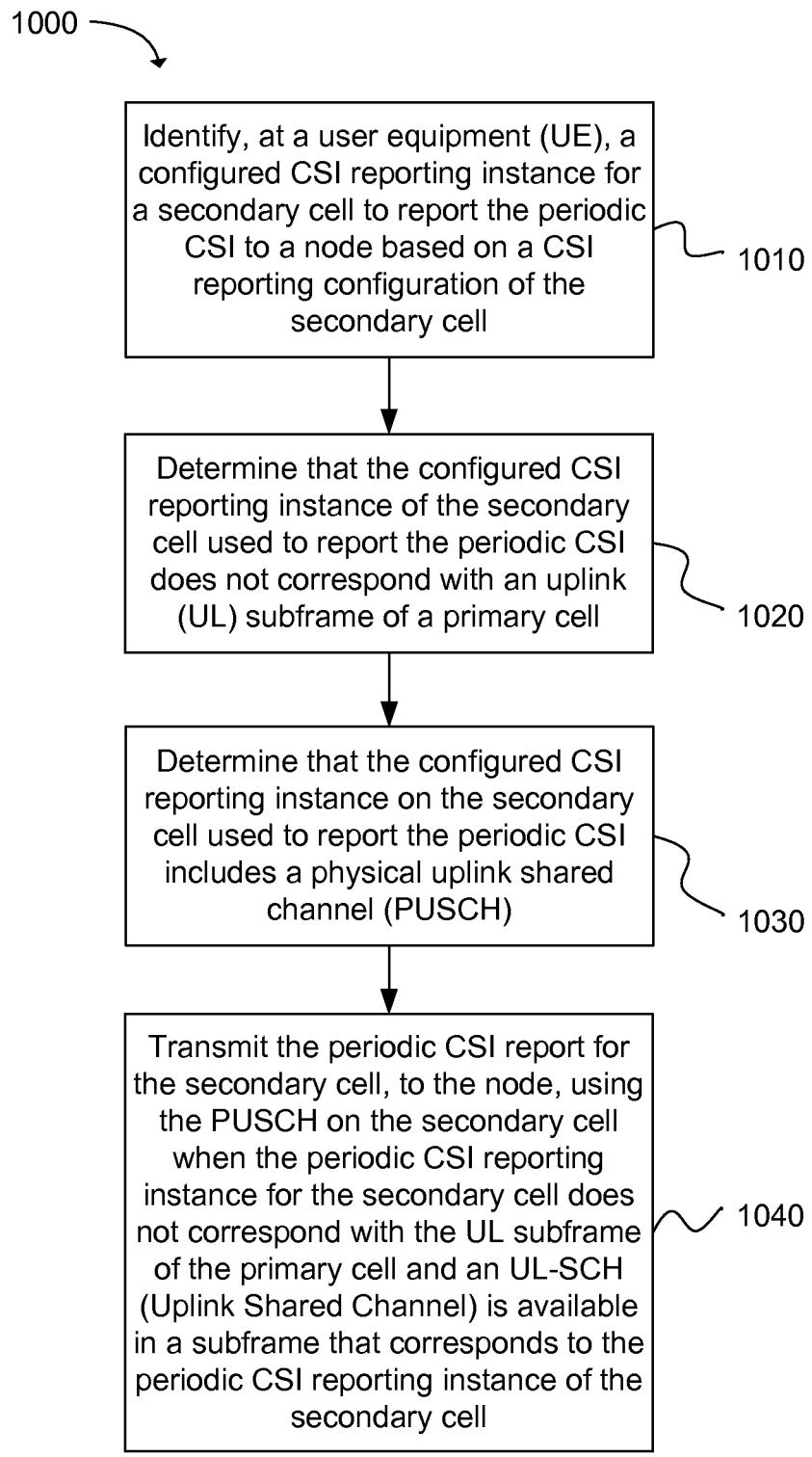
FIG. 10 depicts a flow chart of a method for periodic channel state information (CSI) reporting at a wireless device in accordance with an example.

Another example provides a method 1000 for periodic channel state information (CSI) reporting, as shown in the flow chart in FIG. 10. The method may be executed as instructions on a machine, where the instructions are included on at least one computer readable medium or one non-transitory machine readable storage medium. The method includes the operation of identifying, at a user equipment (UE), a periodic CSI reporting instance for a secondary cell to report the periodic CSI to a node based on a CSI reporting configuration of the secondary cell, as in block 1010. The method can include determining that the periodic CSI reporting instance of the secondary cell used to report the periodic CSI does not correspond with an uplink (UL) subframe of a primary cell, as in block 1020. The next operation of the method can be determining that the periodic CSI reporting instance on the secondary cell used to report the periodic CSI includes a physical uplink shared channel (PUSCH), as in block 1030. The method can further include transmitting the periodic CSI report for the secondary cell, to the node, using the PUSCH on the secondary cell when the periodic CSI reporting instance for the secondary cell does not correspond with the UL subframe of the primary cell and an UL-SCH (Uplink Shared Channel) is available in a subframe that corresponds to the periodic CSI reporting instance of the secondary cell, as in block 1040.

In one configuration, the method can include multiplexing the periodic CSI report of the secondary cell on the PUSCH of the secondary cell; and transmitting uplink control information (UCI) and the uplink shared channel (UL-SCH) using the PUSCH of the secondary cell. In addition, the method can include dropping the periodic CSI report for the secondary cell when the periodic CSI reporting instance for the secondary does not correspond with the UL subframe on the primary cell and the secondary cell does not include the PUSCH with the UL-SCH. In one example, the primary cell has a Time-Division Duplex (TDD) uplink-downlink (UL-DL) configuration different than the TDD UL-DL configuration of the secondary cell.

In one configuration, the method can include receiving a Channel Quality Index-Precoding Matrix Indicator (CQI-PMI) configuration index for the primary cell to enable the periodic CSI reporting instance for the secondary cell to correspond with the UL subframe of the primary cell. In addition, the method may include selecting a Channel Quality Index-Precoding Matrix Indicator (CQI-PMI) configuration index to provide a periodicity (Npd) of greater than 10 milliseconds (ms) for the secondary cell. Furthermore, the method can include delaying the periodic CSI for the secondary cell to a succeeding UL subframe of the primary cell when the UL subframe on the primary cell does not correspond to the periodic CSI reporting instance on the secondary cell.

In one example, the method can further include determining that the periodic CSI report delayed to the succeeding UL subframe in the primary cell collides with a scheduled periodic CSI report to be performed on the succeeding UL subframe in the primary cell; and dropping the periodic CSI report based on a priority level of the periodic CSI report, wherein PUCCH reporting types 3, 5, 6, and 2a have a priority higher than PUCCH reporting types 1, 1a, 2, 2b, 2c, and 4, and PUCCH reporting types 2, 2b, 2c, and 4 have a priority higher than PUCCH reporting types 1 and 1a.

In another configuration, the method can include determining that the p-CSI configuration of the secondary cell is a subset of the p-CSI configuration of the primary cell. In one example, the node can be selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

Figure 11:
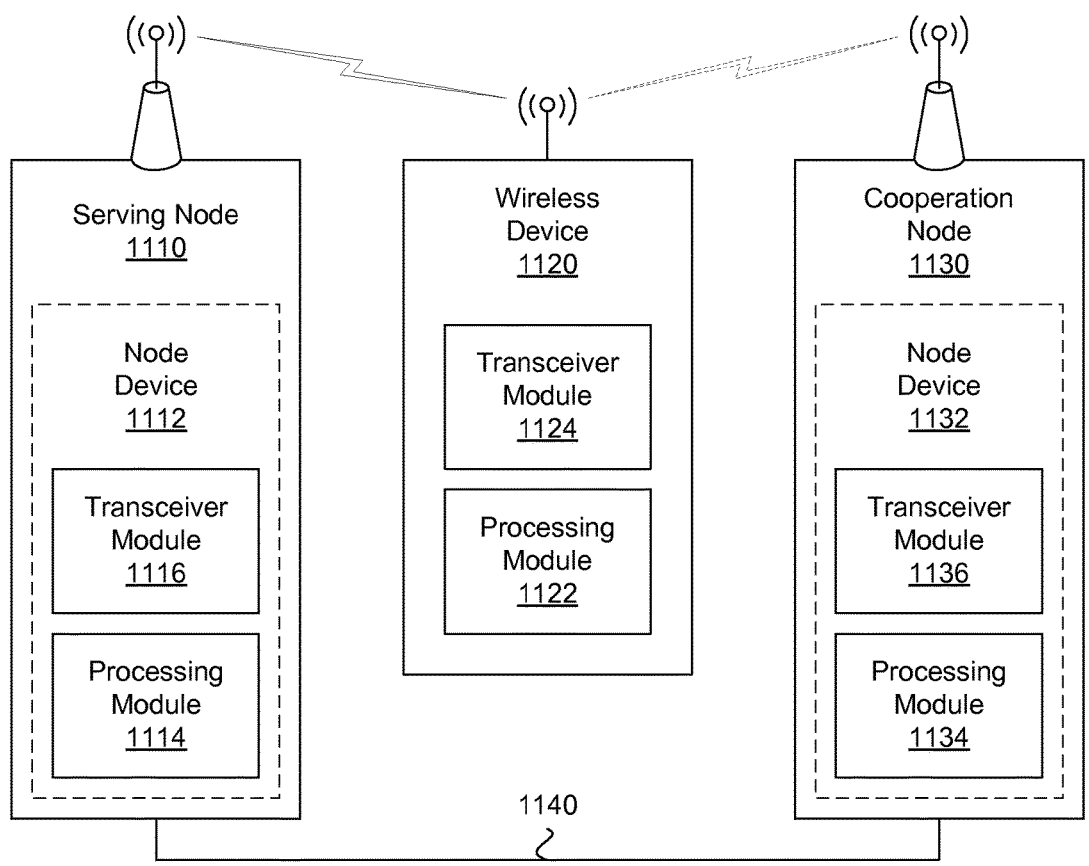
FIG. 11 illustrates a block diagram of a serving node, a coordination node, and wireless device in accordance with an example.

FIG. 11 illustrates an example node (e.g., serving node 1110 and cooperation node 1130) and an example wireless device 1120. The node can include a node device 1112 and 1132. The node device or the node can be configured to communicate with the wireless device. The node device can be configured to receive periodic channel state information (CSI). The node device or the node can be configured to communicate with other nodes via a backhaul link 1140 (optical or wired link), such as an X2 application protocol (X2AP). The node device can include a processing module 1114 and 1134 and a transceiver module 1116 and 1136. The transceiver module can be configured to receive a periodic channel state information (CSI) in a PUCCH. The transceiver module 1116 and 1136 can be further configured to communicate with the coordination node via an X2 application protocol (X2AP). The processing module can be further configured to process the periodic CSI reports of the PUCCH. The node (e.g., serving node 1110 and cooperation node 1130) can include a base station (BS), a Node B (NB), an evolved Node B (eNB), a baseband unit (BBU), a remote radio head (RRH), a remote radio equipment (RRE), or a remote radio unit (RRU).

The wireless device 1120 can include a transceiver module 1124 and a processing module 1122. The wireless device can be configured for a periodic channel state information (CSI) reporting. The processing module can be configured to identify a periodic CSI reporting instance for a secondary cell to report the periodic CSI to an evolved node B (eNB), based on a CSI reporting configuration of the secondary cell; determine that the periodic CSI reporting instance for the secondary cell used to report the periodic CSI does not correspond with an UL subframe of a primary cell; and determine that the periodic CSI reporting instance for the secondary cell used to report the periodic CSI includes a physical uplink shared channel (PUSCH). The transceiver module can be configured to transmit the periodic CSI report for the secondary cell, to the eNB, using the PUSCH on the secondary cell.

In one example, the processing module can be further configured to multiplex the periodic CSI report of the secondary cell on the PUSCH of the secondary cell before uplink control information (UCI) and an uplink shared channel (UL-SCH) are transmitted to the eNB using the PUSCH of the secondary cell. In addition, the processing module can be configured to receive a CSI reporting configuration of the secondary cell that corresponds with a CSI reporting configuration of the primary cell, based on a Channel Quality Index-Precoding Matrix Indicator (CQI-PMI) configuration index that determines both a reporting period ($N_{pd}$) and an offset period for the CSI reporting in UL subframes of the secondary cell.

In another example, an $N_{pd}$ value of 1 applies to Time-Division Duplex (TDD) uplink-downlink (UL-DL) configurations 0, 1, 3, 4, and 6 for the primary cell and all UL subframes of the primary cell are used for periodic CSI reporting, the Npd value of 5 applies to TDD UL-DL configurations 0, 1, 2, and 6 for the primary cell, and the $N_{pd}$ value of 10, 20, 40, 80, or 160 applies to TDD UL-DL configurations 0, 1, 2, 3, 4, 5, and 6.

Figure 12:
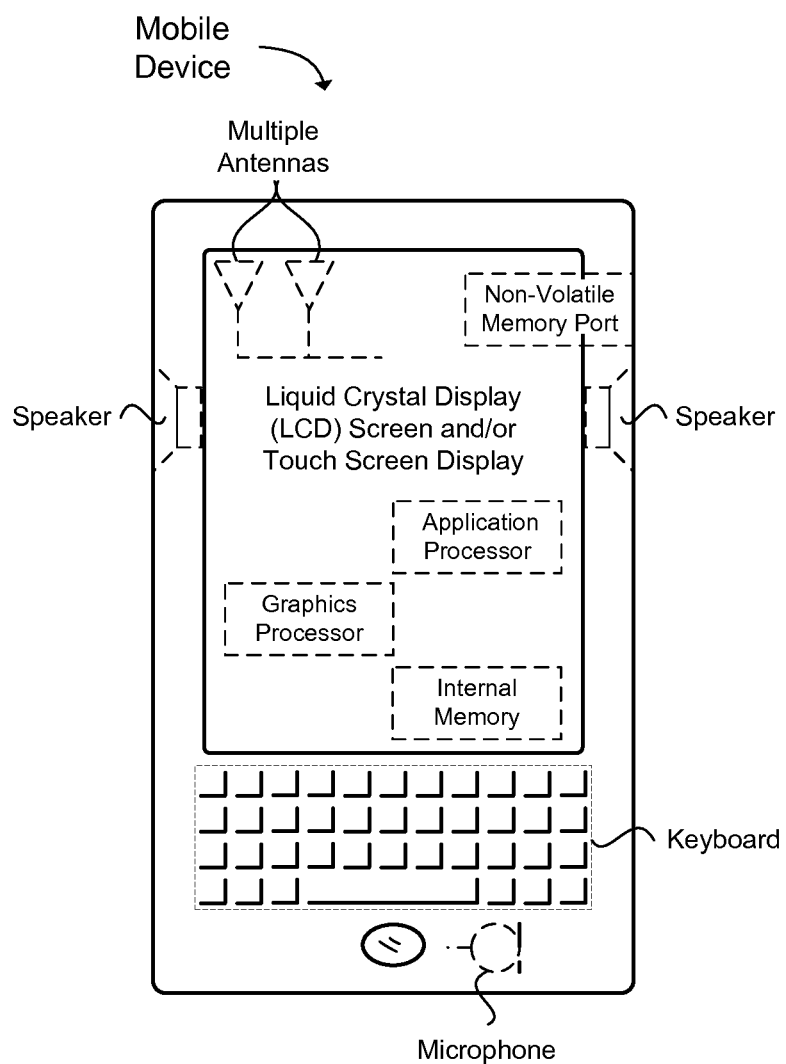
FIG. 12 illustrates a diagram of a wireless device (e.g., UE) in accordance with an example.

FIG. 12 provides an example illustration of the wireless device, such as user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An evolved node B (eNodeB) operable to receive periodic channel state information (CSI) from a user equipment (UE), the eNodeB comprising:
   memory; and
   one or more processors configured to:
   send, to the UE, a reporting period ($N_{pd}$) for a serving cell of the UE;
   send, to the UE, a Time-Division Duplex (TDD) uplink-downlink (UL-DL) configuration of a primary cell of the UE; and
   receive, at the eNodeB from the UE, multiple periodic CSI reports using a physical uplink control channel (PUCCH) on the primary cell according to the reporting period, wherein each periodic CSI report corresponds to one or more CSI processes of the serving cell and each CSI process has a CSI process index, wherein transmission mode (TM) 10 is used at the UE to transmit the multiple periodic CSI reports to the eNodeB, wherein colliding periodic CSI reports of the serving cell are dropped at the UE except a periodic CSI report corresponding to a CSI process with a lowest CSI process index, wherein:
   the reporting period $N_{pd}=1$ is selected for the serving cell when the TDD UL-DL configuration of the primary cell is 0, 1, 3, 4, or 6 and all UL subframes of the primary cell in a radio frame are used for periodic CSI reporting; or
   the reporting period $N_{pd}=5$ is selected for the serving cell when the TDD UL-DL configuration of the primary cell is 0, 1, 2, or 6; or
   the reporting period $N_{pd}=10, 20, 40, 80,$ or 160 is selected for the serving cell for all TDD UL-DL configurations of the primary cell.

2. The eNodeB of claim 1, wherein the one or more processors are further configured to send the reporting period ($N_{pd}$) to the UE using a channel quality indicator-precoding matrix indicator (CQI-PMI) configuration index (cqi-pmi-ConfigIndex) parameter, wherein the reporting period ($N_{pd}$) is sent from the eNodeB to the UE via Radio Resource Control (RRC) signaling.

3. The eNodeB of claim 1, wherein the reporting period $N_{pd}$ is defined as a number of subframes after which the UE is configured to transmit the multiple periodic CSI reports to the eNodeB.

4. The eNodeB of claim 1, wherein the multiple periodic CSI reports are periodic channel quality indicator-precoding matrix indicator (CQI-PMI) reports.

5. The eNodeB of claim 1, wherein the multiple periodic CSI reports received from the UE include one or more of: a channel quality indicator (CQI), a precoding matrix indicator (PMI), a precoding type indicator (PTI) or a rank indicator (RI).

6. A user equipment (UE) operable to report periodic channel state information (CSI), the UE comprising:
   memory; and
   one or more processors configured to:
   determine a reporting period (Ni) of a serving cell of the UE;
   determine a Time-Division Duplex (TDD) uplink-downlink (UL-DL) configuration of a primary cell of the UE; and
   transmit multiple periodic CSI reports to an evolved node B (eNodeB) using a physical uplink control channel (PUCCH) on the primary cell according to the reporting period, wherein each periodic CSI report corresponds to one or more CSI processes of the serving cell and each CSI process has a CSI process index, wherein the UE is configured to transmit the multiple periodic CSI reports to the eNodeB using transmission mode (TM) 10, wherein colliding periodic CSI reports of the serving cell are dropped at the UE except a periodic CSI report corresponding to a CSI process with a lowest CSI process index, wherein:
   the reporting period $N_{pd}=1$ is selected for the serving cell when the TDD UL-DL configuration of the primary cell is 0, 1, 3, 4, or 6 and all UL subframes of the primary cell in a radio frame are used for periodic CSI reporting; or
   the reporting period $N_{pd}=5$ is selected for the serving cell when the TDD UL-DL configuration of the primary cell is 0, 1, 2, or 6; or
   the reporting period $N_{pd}=10, 20, 40, 80,$ or 160 is selected for the serving cell for all TDD UL-DL configurations of the primary cell.

7. The UE of claim 6, wherein the reporting period ($N_{pd}$) is determined using a channel quality indicator-precoding matrix indicator (CQI-PMI) configuration index (cqi-pmi-ConfigIndex) parameter.

8. The UE of claim 6, wherein the multiple periodic CSI reports are periodic channel quality indicator-precoding matrix indicator (CQI-PMI) reports.

9. The UE of claim 6, wherein the multiple periodic CSI reports include one or more of: a channel quality indicator (CQI), a precoding matrix indicator (PMI), a precoding type indicator (PTI) or a rank indicator (RI).

10. The UE of claim 6, wherein the reporting period ($N_{pd}$) is determined based on a channel quality indicator-precoding matrix indicator (CQI-PMI) configuration index (cqi-pmi-ConfigIndex) parameter received from the eNodeB via Radio Resource Control (RRC) signaling.

11. The UE of claim 6, wherein the reporting period ($N_{pd}$) is defined as a number of subframes after which the UE is configured to transmit the multiple periodic CSI reports to the eNodeB.

12. The UE of claim 6, wherein the UE includes an antenna, a touch sensitive display screen, a speaker, a microphone, a graphics processor, an application processor, an internal memory, or a non-volatile memory port.

13. At least one non-transitory computer readable medium having instructions embodied thereon for receiving periodic channel state information (CSI) at an evolved node B (eNodeB), the instructions when executed perform the following:
   sending, using at least one processor of the eNodeB, a reporting period ($N_{pd}$) to a user equipment (UE), wherein the reporting period ($N_{pd}$) is of a serving cell of the UE;
   sending, using the at least one processor of the eNodeB, a Time-Division Duplex (TDD) uplink-downlink (UL-DL) configuration to the UE, wherein the TDD UL-DL configuration is of a primary cell of the UE; and
   receiving, using the at least one processor of the eNodeB, multiple periodic CSI reports using a physical uplink control channel (PUCCH) on the primary cell according to the reporting period, wherein each periodic CSI report corresponds to one or more CSI processes of the serving cell and each CSI process has a CSI process index, wherein transmission mode (TM) 10 is used at the UE to transmit the multiple periodic CSI reports to the eNodeB, wherein colliding periodic CSI reports of the serving cell are dropped at the UE except a periodic CSI report corresponding to a CSI process with a lowest CSI process index, wherein:

the reporting period $N_{pd}=1$ is selected for the serving cell when the TDD UL-DL configuration of the primary cell is 0, 1, 3, 4, or 6 and all UL subframes of the primary cell in a radio frame are used for periodic CSI reporting; or the reporting period $N_{pd}=5$ is selected for the serving cell when the TDD UL-DL configuration of the primary cell is 0, 1, 2, or 6; or the reporting period $N_{pd}=10, 20, 40, 80,$ or 160 is selected for the serving cell for all TDD UL-DL configurations of the primary cell.

14. The at least one non-transitory computer readable medium of claim 13, further comprising instructions which when executed by the at least one processor of the eNodeB performs the following: sending the reporting period ($N_{pd}$) to the UE using a channel quality indicator-precoding matrix indicator (CQI-PMI) configuration index (cqi-pmi-Config-Index) parameter, wherein the reporting period ($N_{pd}$) is sent from the eNodeB to the UE via Radio Resource Control (RRC) signaling.

15. The at least one non-transitory computer readable medium of claim 13, wherein the multiple periodic CSI reports are periodic channel quality indicator-precoding matrix indicator (CQI-PMI) reports.

16. The at least one non-transitory computer readable medium of claim 13, wherein the multiple periodic CSI reports include one or more of: a channel quality indicator (CQI), a precoding matrix indicator (PMI), a precoding type indicator (PTI) or a rank indicator (RI).

17. The at least one non-transitory computer readable medium of claim 13, wherein the reporting period ($N_{pd}$) is defined as a number of subframes after which the UE is configured to transmit a periodic CSI report to the eNodeB.

* * * * *